(12) United States Patent
Inaguchi

(10) Patent No.: US 9,566,680 B2
(45) Date of Patent: Feb. 14, 2017

(54) MACHINE TOOL HAVING SCATTERING PREVENTION COVER

(71) Applicant: FANUC Corporation, Yamanashi (JP)

(72) Inventor: Yuuzou Inaguchi, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 288 days.

(21) Appl. No.: 14/310,695

(22) Filed: Jun. 20, 2014

(65) Prior Publication Data

US 2014/0377028 A1 Dec. 25, 2014

(30) Foreign Application Priority Data

Jun. 21, 2013 (JP) ................................. 2013-131077

(51) Int. Cl.
*B23Q 15/12* (2006.01)
*B23Q 11/00* (2006.01)
*B23Q 11/08* (2006.01)

(52) U.S. Cl.
CPC ........... *B23Q 11/0042* (2013.01); *B23Q 11/08* (2013.01); *B23Q 15/12* (2013.01); *Y02P 70/171* (2015.11); *Y10T 409/30392* (2015.01)

(58) Field of Classification Search
CPC ............. B23Q 11/0028; B23Q 11/0053; B23Q 11/0067; B23Q 11/0075; B23Q 11/08; B23Q 15/08; B23Q 15/12; Y10T 409/30392
See application file for complete search history.

(56) References Cited

U.S. PATENT DOCUMENTS 5,263,800 A 11/1993 Chen
7,383,098 B2* 6/2008 Rauser ................ G05B 19/416
700/162

FOREIGN PATENT DOCUMENTS

| CN | 102009356 A | 4/2011 | |
|----|---|---|---|
| CN | 202825419 U | 3/2013 | |
| JP | 57-170941 U | 10/1982 | |
| JP | 4-177893 A | 6/1992 | |
| JP | 2002-36058 A | 2/2002 | |
| JP | 2002-132319 A | 5/2002 | |
| JP | 2002-283180 A | 10/2002 | |
| JP | 2006-68859 A | 3/2006 | |
| JP | 2012-236268 A | 12/2012 | |
| SU | 1269971 A1 * | 11/1986 | ......... B23Q 11/0042 |

OTHER PUBLICATIONS

Office Action mailed Jan. 20, 2015, corresponding to Japanese patent application No. 2013-131077.
Office Action mailed Sep. 30, 2014, corresponding to Japanese patent application No. 2013-131077.
Decision to Grant a Patent mailed Apr. 7, 2015, corresponding to Japanese patent application No. 2013-131077.

* cited by examiner

*Primary Examiner* — Sunil K Singh
*Assistant Examiner* — Alan Snyder
(74) *Attorney, Agent, or Firm* — Hauptman Ham, LLP

(57) ABSTRACT

A machine tool has a saddle moving over a bed and a table moving over the saddle. A scattering prevention cover that receives chips generated and a cutting fluid supplied during machining of a workpiece placed on the table is fixed to the table. A first flow path fixed to the saddle receives the chips and cutting fluid discharged from the scattering prevention cover, and a second flow path fixed to the bed receives and discharges the chips and cutting fluid discharged from the first flow path.

8 Claims, 6 Drawing Sheets

MACHINE TOOL HAVING SCATTERING PREVENTION COVER

RELATED APPLICATIONS

The present application claims priority to Japanese Application Number 2013-131077, filed Jun. 21, 2013, the disclosure of which is hereby incorporated by reference herein in its entirety.

BACKGROUND OF THE INVENTION

1. Field of the Invention

The present invention relates to a machine tool having a scattering prevention cover that prevents scattering of chips and a cutting fluid throughout the inside of a splash guard when the machine tool is used.

2. Description of the Related Art

Typically, as a prevention against scattering of chips generated and a cutting fluid supplied to a workpiece (cutting portion) during machining of the workpiece, a machining area is covered with a splash guard or a covering component, screening component, shielding component, or the like is set around the workpiece to suppress scattering of the chips and cutting fluid (see Japanese Patent Application Laid-Open No. 2002-283180 and Japanese Patent Application Laid-Open No. 2012-236268, for example).

Japanese Patent Application Laid-Open No. 2002-283180 discloses a technique by which a shielding component for suppressing scattering of chips on a table is provided, in addition to a splash guard for covering a machining area. However, there is no description about where the non-scattering chips are stored and how these chips are treated.

Japanese Patent Application Laid-Open No. 2012-236268 discloses a technique by which receiving plates and chip trays are provided around a workpiece, chips and a cutting fluid are received and stored in the chip trays, and the chips are collected from the stored cutting fluid. However, this technique is applied to a machine tool that has only one movement axis, and there is no description about application of the technique to a machine tool that has three movement axes (X-, Y-, and Z-axes).

SUMMARY OF THE INVENTION

An object of the present invention is accordingly to provide a machine tool that has a scattering prevention cover, and can collect chips and a cutting fluid while minimizing scattering of the chips and cutting fluid in the vicinity of a table, and can discharge the collected chips and cutting fluid to a cutting fluid treatment unit.

A machine tool according to the present invention has a saddle moving over a bed and a table moving over the saddle, and machines a workpiece placed on the table. The machine tool includes: a scattering prevention cover that is fixed to the table, receives chips generated and a cutting fluid supplied during machining of a workpiece on the table, surrounds the workpiece, and has a discharging section that discharges the chips and cutting fluid; a first flow path that is fixed to the saddle, receives the chips and cutting fluid discharged from the discharging section of the scattering prevention cover, and has a discharging section that discharges the received chips and cutting fluid; and a second flow path that is fixed to the bed, receives the chips and cutting fluid discharged from the discharging section of the first flow path, and has a discharging section that discharges the received chips and cutting fluid.

The first flow path or second flow path may be tilted toward the relevant discharging section.

The machine tool may further include a control unit that controls the machine tool, and the control unit may include an acceleration adjusting section with which, when the table or saddle moves during machining of the workpiece, the acceleration of the movement is adjusted.

According to the present invention, it is possible to provide a machine tool that has a scattering prevention cover, and can collect chips and a cutting fluid while minimizing scattering of the chips and cutting fluid in the vicinity of a table, and can discharge the collected chips and cutting fluid to a cutting fluid treatment unit.

BRIEF DESCRIPTION OF THE DRAWINGS

The above and other objects and features of the present invention will be apparent from the following description of embodiments with reference to the appended drawings, in which.

DETAILED DESCRIPTION OF THE PREFERRED EMBODIMENTS

Figure 1:
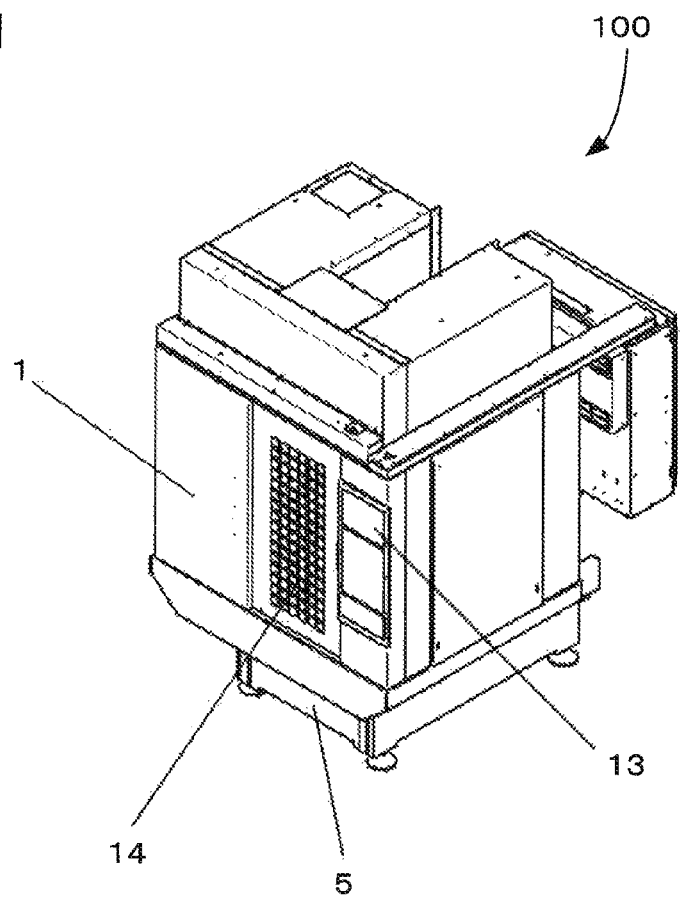
FIG. 1 is a diagrammatic perspective view of a machine tool.

In a machine tool 100, a machining area formed on the upper part of a bed 5 is covered with a splash guard 1 as shown in FIG. 1. On a side of the splash guard 1, an opening is provided to take a workpiece in and out, and an open/close door 14 is installed in the opening in an openable manner. A control unit 13 with a display that controls the machine tool 100 is installed in the vicinity of the open/close door 14 of the splash guard 1.

A column 4 with a spindle 9 installed is erected on the bed 5. The column 4 is located at the rear of a saddle 3, and the open/close door 14 is located at the front of the saddle 3. A tool 10 is attached to the spindle 9. The spindle 9 is controlled liftably with respect to a table 2 (that is, movably in the Z-axis direction).

The saddle 3 is supported on the bed 5, and the table 2 is supported on the saddle 3. A workpiece or machining jig is placed on the table 2. The saddle 3 moves over the bed 5 in the X-axis direction, and the table 2 moves over the saddle 3 in the Y-axis direction, which is orthogonal to the X-axis. A scattering prevention cover 6 that surrounds the workpiece (not shown) placed on the table 2 is fixed to the table 2 with bolts or the like.

Figure 2:
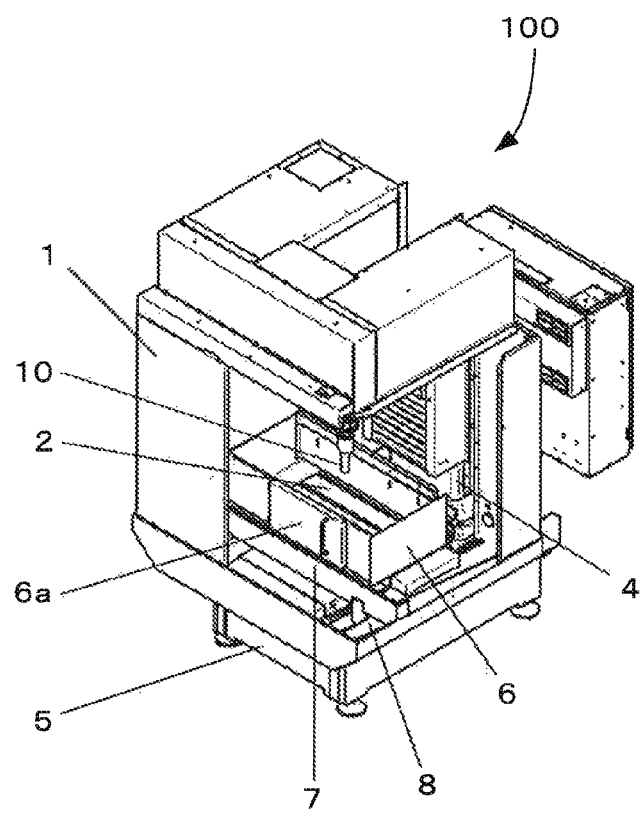
FIG. 2 illustrates the inside of the machine tool shown in FIG. 1, from which a part of a splash guard and an open/close door are removed.

The scattering prevention cover 6 prevents extensive scattering of chips generated and a cutting fluid supplied during machining of a workpiece, and has a size that keeps the cover from interfering with any machine tool component even in a stroke through a full-range of movement along the X-, Y-, or Z axis of the machine tool. Therefore, the scattering prevention cover 6 includes the sides and bottom that surround the workpiece such that an area protruding from an end of the table 2 is enclosed. As shown in FIG. 2, the scattering prevention cover 6 is fixed to the table 2 with fasteners such as bolts (not shown). The scattering prevention cover 6 includes a scattering prevention cover door 6a that can be opened and closed when the workpiece or machining jig is set. The scattering prevention cover door 6a is installed in a plane of the scattering prevention cover 6 on the side of the open/close door 14, and is opened and closed in a sliding manner along the side of the scattering prevention cover 6.

Figure 4A:
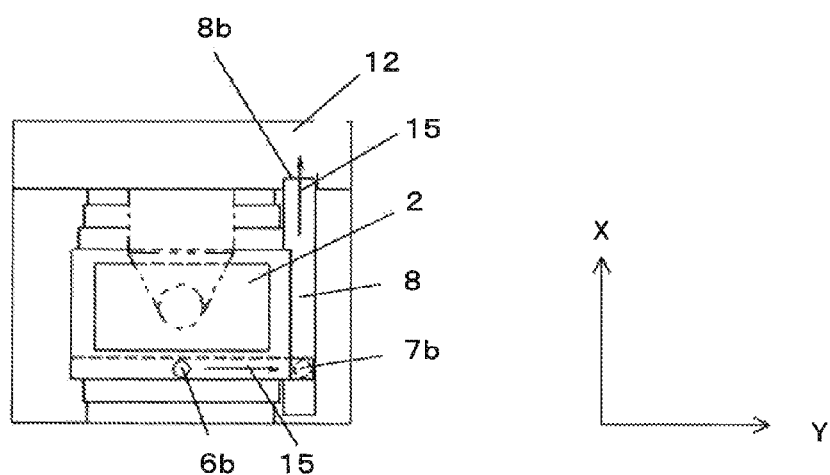
FIGS. 4A and 4B illustrate a first embodiment of the machine tool according to the present invention, in which a flow path that receives chips and a cutting fluid discharged from the scattering prevention cover is fixed to one side of a bed (FIG. 4A is a top view and FIG. 4B is a front view)
Figure 4B:
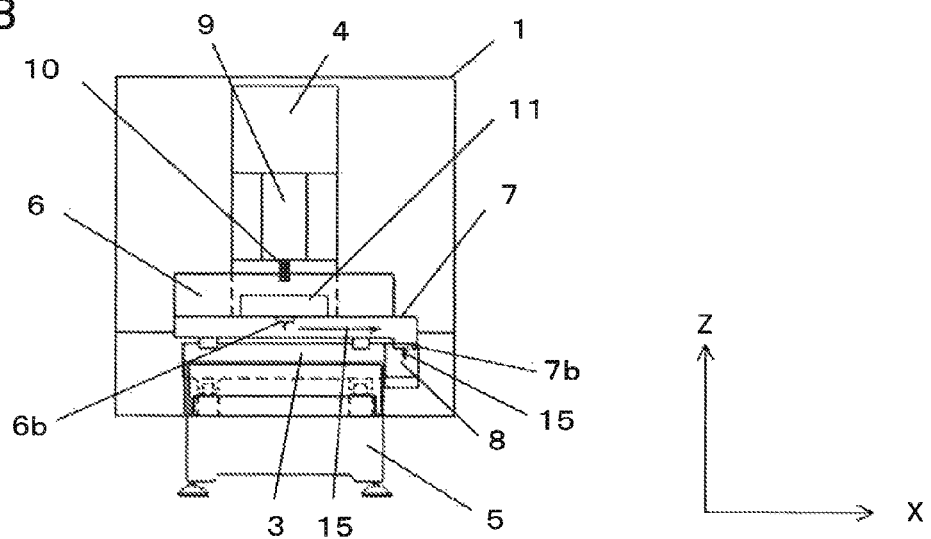
Figure 5A:
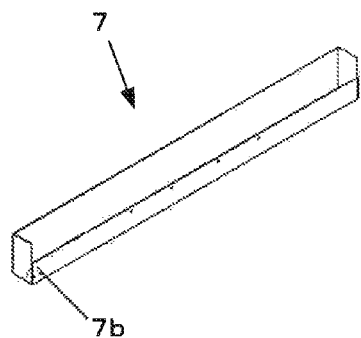
FIGS. 5A and 5B illustrate an example of the shape of a saddle-fixed flow path shown in FIG. 2 (FIG. 5A is a diagrammatic perspective view, FIG. 5B (a) is a top view, FIG. 5B (b) is a left side view, FIG. 5B (c) is a right side view, and FIG. 5B (d) is a front view)
Figure 5B:
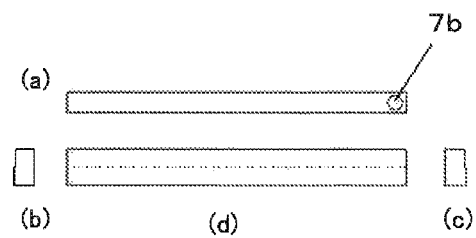
Figure 6A:
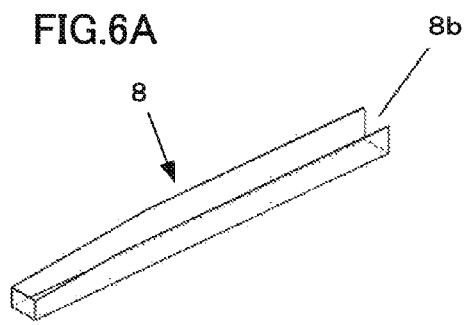
FIGS. 6A and 6B illustrate an example of the shape of a bed-fixed flow path shown in FIG. 2 (FIG. 6A is a diagrammatic perspective view, FIG. 6B (a) is a top view, FIG. 6B (b) is a left side view, FIG. 6B (c) is a right side view, and FIG. 6B (d) is a front view)
Figure 6B:
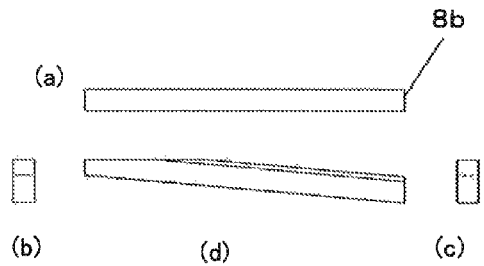

When a workpiece is machined, chips and a cutting fluid gradually accumulate within the scattering prevention cover 6. To address this, a scattering prevention cover discharging section 6b (specifically, a discharge outlet) is provided at the bottom of the scattering prevention cover 6 to discharge the chips and cutting fluid that have accumulated within the scattering prevention cover 6, as shown in FIGS. 4A and 4B. The chips and cutting fluid are discharged to the outside of the scattering prevention cover 6 through the scattering prevention cover discharging section 6b. Flow paths are fixed to the saddle 3 and the bed 5 to sequentially receive the chips and cutting fluid discharged from the scattering prevention cover 6.

Figure 3:
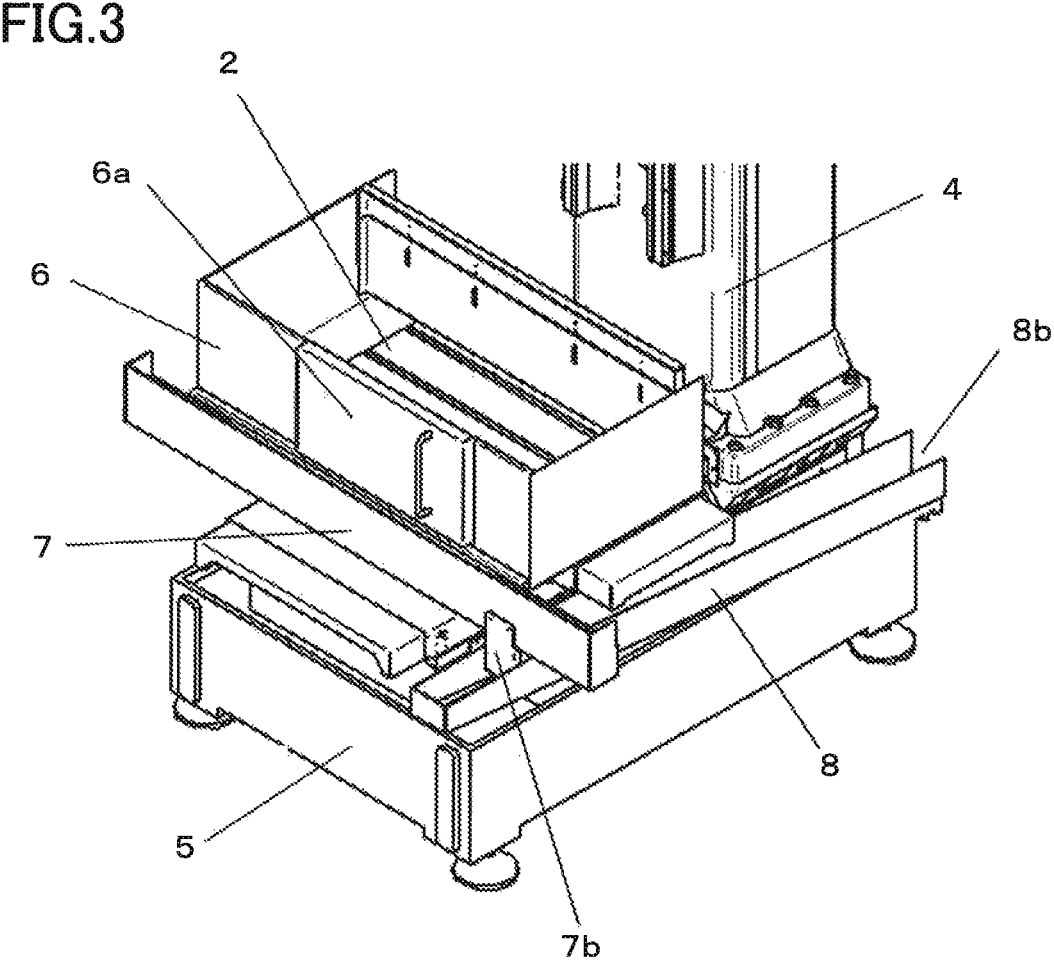
FIG. 3 illustrates a scattering prevention cover shown in FIG. 2.

A saddle-fixed flow path 7 (first flow path), which is fixed to the saddle 3, receives the chips and cutting fluid discharged from the scattering prevention cover 6, and has a gutter shape with an open top and closed ends as shown in FIG. 3. A bed-fixed flow path 8 (second flow path), which is fixed to the bed 5, receives the chips and cutting fluid discharged from a saddle-fixed flow path discharging section 7b of the saddle-fixed flow path 7, and is located below the saddle-fixed flow path 7 as shown in FIGS. 3 and 4B. When placed in any position within the relevant range of movement, the saddle 3 has the saddle-fixed flow path discharging section 7b (specifically, a discharge outlet), which discharges the chips and cutting fluid from the scattering prevention cover discharging section 6b to the bed-fixed flow path 8.

The bed-fixed flow path 8 is shaped so as to extend from the front of the bed 5 to the rear, receive the chips and cutting fluid discharged from the saddle-fixed flow path 7, send the chips and cutting fluid to the rear, and discharge the chips and cutting fluid to a cutting fluid supply unit 12 (FIG. 4A) included with the machine tool 100 (or discharge the chips and cutting fluid to the lower part of the splash guard 1). Accordingly, the chips and cutting fluid can be more efficiently collected and sent to the cutting fluid supply unit 12, making it possible to decrease the frequency of failures due to scattering and accumulation of the chips and cutting fluid within the splash guard 1. Even when the chips and cutting fluid fly out of the scattering prevention cover 6 during machining, the chips and cutting fluid do not fly out of the machine tool 100 because the splash guard 1 is provided.

As shown in FIG. 3, the saddle-fixed flow path discharging section 7b is disposed at an end of the bottom of the saddle-fixed flow path 7. The saddle-fixed flow path 7 has an open top, and can receive the chips and cutting fluid discharged from the scattering prevention cover discharging section 6b. The received chips and cutting fluid are discharged from the saddle-fixed flow path discharging section 7b.

As shown in FIG. 3, a bed-fixed flow path discharging section 8b is disposed at an end of the bed-fixed flow path 8. The bed-fixed flow path 8 has an open top, and can receive the chips and cutting fluid discharged from the saddle-fixed flow path discharging section 7b. The received chips and cutting fluid are discharged from the bed-fixed flow path discharging section 8b.

Figure 7A:
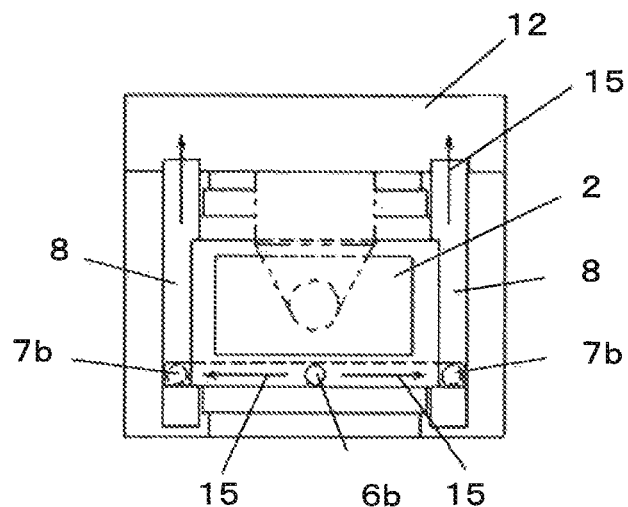
FIGS. 7A and 7B illustrate a second embodiment of the machine tool according to the present invention, in which flow paths that receive chips and a cutting fluid discharged from the scattering prevention cover are fixed to both sides of the bed (FIG. 7A is a top view and FIG. 7B is a front view)
Figure 7B:
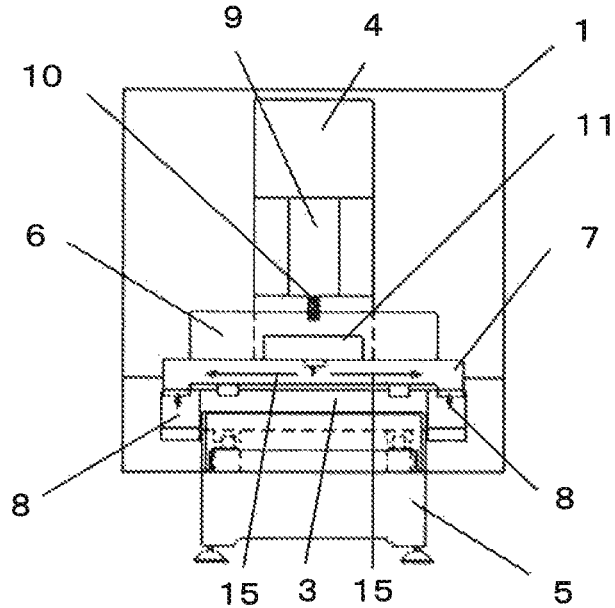

In the embodiment shown in FIGS. 3, 4A, and 4B, the bed-fixed flow path 8, which receives the chips and cutting fluid discharged from the saddle-fixed flow path discharging section 7b, is fixed to one side of the bed 5. Instead, the bed-fixed flow paths 8, which receive the chips and cutting fluid discharged from the saddle-fixed flow path discharging section 7b, may be fixed to both sides of the bed 5 as shown in FIGS. 7A and 7B. When the chips and cutting fluid are discharged with the two bed-fixed flow paths 8, the chips and cutting fluid can be discharged from both sides of the bed 5.

The saddle-fixed flow path 7, which receives the chips and cutting fluid discharged from the scattering prevention cover 6, and the bed-fixed flow path 8, which receives the chips and cutting fluid discharged from the saddle-fixed flow path discharging section 7b, may be tilted toward the relevant discharging sections 7b, 8b, in order to improve the flow of the chips and cutting fluid through the flow paths 7, 8.

When the machine tool includes the cutting fluid supply unit 12, the chips and cutting fluid can be discharged from the bed-fixed flow path 8, which is fixed to the bed 5, toward the cutting fluid supply unit 12 as shown in FIG. 4A.

Figure 8A:
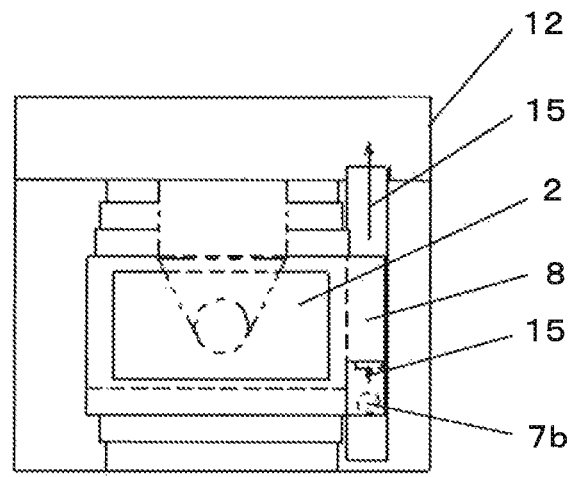
FIGS. 8A and 8B illustrate an example in which a scattering prevention cover discharging section is disposed on a side of the scattering prevention cover, instead of on the bottom (FIG. 8A is a top view and FIG. 8B is a front view).
Figure 8B:
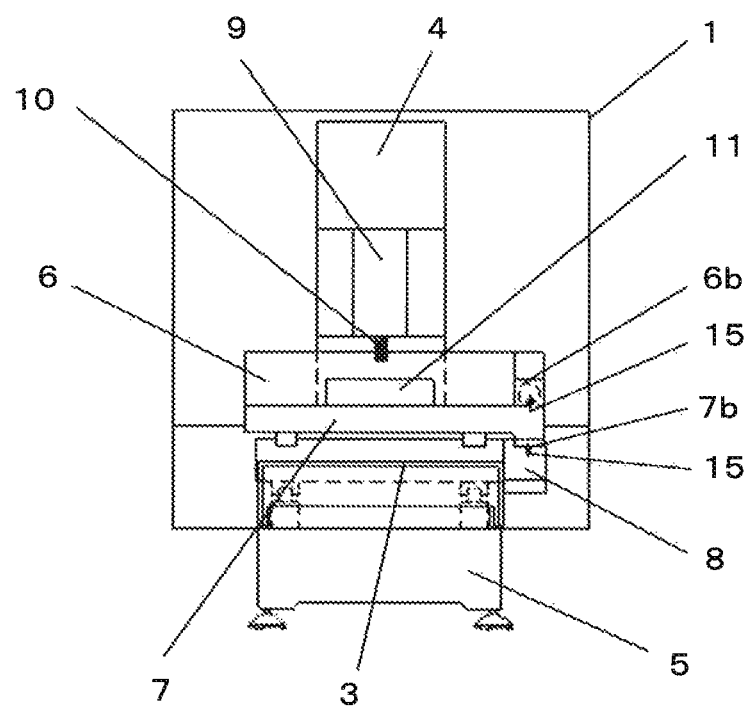

The scattering prevention cover 6, the saddle-fixed flow path 7, and the bed-fixed flow path 8 may have discharging sections with various shapes and structures to discharge chips and a cutting fluid. For the scattering prevention cover 6, the discharging section that discharges the chips and cutting fluid may be disposed on a side of the scattering prevention cover 6, instead of on the bottom, as shown in FIGS. 8A and 8B.

The scattering prevention cover 6 is fixed to the table 2, and therefore moves together with the table 2. The saddle-fixed flow path 7 is fixed to the saddle 3, and therefore moves together with the saddle 3. Accordingly, depending on machining programs for machining workpieces, the table 2 or the saddle 3 may move quickly, causing the chips and cutting fluid that have accumulated in the scattering prevention cover 6 or the saddle-fixed flow path 7 to splash out of the scattering prevention cover 6, the saddle-fixed flow path 7, or the bed-fixed flow path 8.

To prevent this, the acceleration with which the table 2 or the saddle 3 moves during machining is adjusted. Specifically, the control unit 13 recognizes a distance of movement of the table 2 or the saddle 3 in a machining program, and when the movement distance is short, the movement of the table 2 or the saddle 3 completes before the movement speed increases. Therefore, the control unit 13 determines that the acceleration need not be adjusted and makes no adjustment to the acceleration. When the distance of the movement of the table 2 or the saddle 3 in a machining program is long, however, the movement speed reaches a predetermined speed. Therefore, the control unit 13 determines that the acceleration must be adjusted to a range in which the cutting fluid does not fly out, adjusts the acceleration, and then controls the movement of the table 2 or the saddle 3. A criterion for determining whether the distance of the movement of the table 2 or the saddle 3 is short or long is set in the control unit 13 in advance.

The above technique makes it possible to minimize scattering of chips and a cutting fluid within the splash guard 1 and to keep the chips and cutting fluid as far away from main components including a linear guide as possible. This can decrease the frequency with which the chips accumulate on the linear guide that guides the movement of the saddle 3 or the table 2, or grease on the linear guide is washed out by the cutting fluid, resulting in higher reliability of the machine tool.

The scattering prevention cover 6, the saddle-fixed flow path 7, and the bed-fixed flow path 8 need not be fixed directly to the table 2, the saddle 3, and the bed 5, respectively, and may be fixed to other parts without departing from the spirit of the present invention.

The invention claimed is:

1. A machine tool having a saddle moving over a bed and a table moving over the saddle and machining a workpiece placed on the table, the machine tool being controlled by a control unit that executes a machining program, the machine tool comprising:
   a scattering prevention cover that is fixed to the table, receives chips generated and a cutting fluid supplied during machining of a workpiece on the table, surrounds the workpiece, and has a discharging section that discharges the chips and cutting fluid;
   a first flow path that is fixed to the saddle, receives the chips and cutting fluid discharged from the discharging section of the scattering prevention cover, and has a discharging section that discharges the received chips and cutting fluid; and
   a second flow path that is fixed to the bed, receives the chips and cutting fluid discharged from the discharging section of the first flow path, and has a discharging section that discharges the received chips and cutting fluid, wherein
   the control unit is configured to recognize a distance of movement in the machining program when the table or the saddle moves during machining of the workpiece, and to make an adjustment to acceleration according to a criterion of determination of movement distance set in advance in the control unit and then move the table or the saddle.

2. The machine tool according to claim 1, wherein the first flow path or second flow path is tilted toward the corresponding discharging section.

3. The machine tool according to claim 1, further comprising a splash guard that covers the first flow path and the second flow path,
   wherein the splash guard includes an opening and a door configured to close and open the opening.

4. The machine tool according to claim 3, wherein the control unit is installed in a vicinity of the door of the splash guard.

5. The machine tool according to claim 1, wherein the second flow path is fixed to both sides of the bed.

6. The machine tool according to claim 1, wherein the discharging section of the scattering prevention cover is disposed on a bottom of the scattering prevention cover.

7. The machine tool according to claim 1, wherein the discharging section of the scattering prevention cover is disposed on a side of the scattering prevention cover.

8. The machine tool according to claim 1, wherein when the distance of movement is short, the control unit determines that the acceleration need not be adjusted, and when the distance of movement is long, the control unit determines that the acceleration must be adjusted to a range in which the cutting fluid does not fly out.

* * * * *